United States Patent [19]

Doi et al.

[11] Patent Number: 5,296,336
[45] Date of Patent: Mar. 22, 1994

[54] DAMPENING SOLUTION FOR LITHOGRAPHIC PRINTING

[75] Inventors: Kenichi Doi; Masumi Takase, both of Tokyo; Takeya Sakai; Toshio Sato, both of Wakayama; Takashi Ito; Katsuhiro Osaki, both of Tokyo, all of Japan

[73] Assignees: Toyo Ink Manufacturing Co., Ltd.; Kao Corporation; Toppan Printing Co., Ltd., all of Tokyo, Japan

[21] Appl. No.: 803,799

[22] Filed: Dec. 9, 1991

Related U.S. Application Data

[63] Continuation of Ser. No. 563,000, Aug. 6, 1990, abandoned.

[30] Foreign Application Priority Data

Aug. 5, 1989 [JP] Japan .................................. 1-203148

[51] Int. Cl.⁵ .............................................. G03C 5/00
[52] U.S. Cl. .......................................... 430/331; 106/2
[58] Field of Search ....................... 430/309, 323, 331; 106/2

[56] References Cited

U.S. PATENT DOCUMENTS

| | | | |
|---|---|---|---|
| 4,116,896 | 9/1978 | Garrett et al. | 430/283 |
| 4,416,976 | 11/1983 | Schell | 430/331 |
| 4,560,410 | 12/1985 | Burns et al. | 101/451 |

FOREIGN PATENT DOCUMENTS 3439220  7/1985  Fed. Rep. of Germany ...... 430/331

Primary Examiner—Hoa Van Le
Attorney, Agent, or Firm—Sughrue, Mion, Zinn, Macpeak & Seas

[57] ABSTRACT

A dampening solution composition for lithographic printing, which comprises (a) water, and (b) a compound (A) represented by the following formula (I).

$$R-O-(CH_2CHO)_n-H \quad \text{with CH}_3 \text{ branch} \tag{I}$$

wherein R represents a methyl group, an ethyl group, an n-propyl group or an isopropyl group, and n represents an integer of 1 to 4, is disclosed.

5 Claims, 1 Drawing Sheet

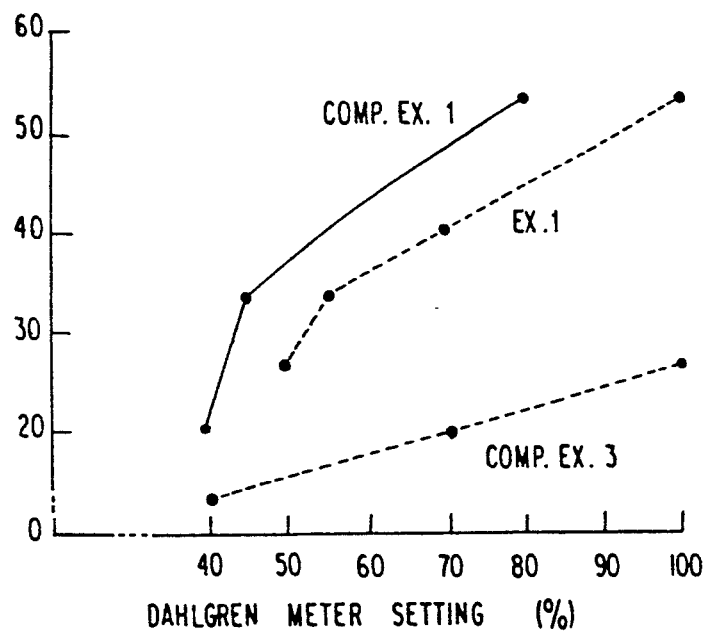

DAMPENING SOLUTION FOR LITHOGRAPHIC PRINTING

This is a continuation of application Ser. No. 07/563,000 filed Aug. 6, 1990, now abandoned.

FIELD OF THE INVENTION

This invention relates to a dampening solution composition for lithographic printing.

BACKGROUND OF THE INVENTION

Lithographic printing is a printing system in which printing is conducted using a printing plate with ink-receptive image areas and hydrophilic ink-repellant non-image areas. Namely, printing is conducted in such a manner that a dampening solution is applied to the surface of the printing plate. The solution is retained in the hydrophilic areas, but repelled by the ink-receptive image areas to which ink is to be applied. It is important for the ink and the dampening solution to be applied to the surface of the printing plate with a good ink-water balance to achieve successful printing. When the amount of the dampening solution applied to the surface of the plate is too large, ink is intensively emulsified and offset or failure in drying occurs. When the amount of the dampening solution is too small, ink adheres to the non-image areas and scumming occurs.

For better control of the balance between ink and the dampening solution, dampening solutions usually contain, in addition to water, about 10% by weight of isopropyl alcohol (IPA) to reduce surface tension, various hydrophilic materials such as gum arabic, carboxymethyl cellulose (CMC), citric acid and various surfactants, an acid such as phosphoric acid as an affinitizing agent to remove oxides on the surface of the plate and ammonium bichromate or nitrates as a corrosion inhibitor for the plate. When the dampening solutions containing IPA are used, good prints can be obtained, transfer of the dampening solution from a pan is good and as a result, water tolerance is increased and workability is improved. The reason of these advantages can be assumed as follows: (1) the wetting of the hydrophilic non-image areas of the plate becomes good and (2) the wetting of dampening rollers by the dampening solution is good and as a result, transfer of water from a pan to the form rollers and the plate is good. However, IPA is a flammable hazardous material. Hence, fire hazards are a concern. Further, IPA is harmful to the human body. Accordingly, a lithographic dampening solution without IPA has been desired.

To this end, JP-B-55-19757 (the term "JP-B" as used herein means an "examined Japanese patent publication") discloses dampening solutions for lithographic printing which contain polyalkylene oxide alkyl ether surfactants, JP-B-46-30323 (corresponding to U.S. Pat. No. 3,547,632) discloses dampening solutions for lithographic printing which contain polyglycol and an anionic surfactant, and JP-A-63-25093 (the term "JP-A" as used herein means an "unexamined published Japanese patent application") (corresponding to EP-A-251621) discloses dampening solutions for lithographic printing which contain polyethylene oxide surfactants.

The surface tension can be certainly reduced by adding usually 0.1 to 0.5% by weight, based on the total weight of the solution, of the surfactant. However, the transfer of the dampening solutions from a pan is poor in comparison with those containing IPA and the wetting of the hydrophilic non-image areas of the plate is not satisfactory.

SUMMARY OF THE INVENTION

The present inventors have studied on the above-described phenomena and the difference of the dynamic surface tensions of the dampening solution on inked rollers rotated at high speed, printing plates and dampening solution feed rollers. As a result, it has now been found that the above-mentioned problems can be solved by using low-molecular propylene oxide alkyl ethers having substantially no surface activity. The present invention has been accomplished on the basis of the above finding. Normally, one would consider that surface tension can be reduced by increasing the amounts of the surfactants to be added. However, the problems of ink bleeding into water and intensive foaming occur when the amounts of the surfactants are increased.

Accordingly, a principal object of the present invention is to provide a dampening solution for lithographic printing which is a substitute for those using isopropyl alcohol.

The present invention thus provides a dampening solution composition for lithographic printing, which comprises (a) water, and (b) a compound represented by the following general formula (I).

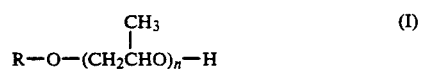

wherein R represents a methyl group, an ethyl group, an n-propyl group or an isopropyl group, and n represents an integer of 1 to 4.

BRIEF DESCRIPTION OF THE DRAWING

The Figure is a graph showing the relationship between Dahlgren meter setting and the amount of the dampening solution on the plate illustrating the condition of transfer of the dampening solution from a pan to the form rollers and the plate of each of the dampening solutions of Example 1 and Comparative Example 1 and 3.

DETAILED DESCRIPTION OF THE INVENTION

Compounds (A) of formula (I) of the present invention are used in an amount of 0.1 to 10% by weight based on the total weight of the dampening solution. The upper temperature of the dampening solution on printing presses is 35° to 40° C. and micelle formability is low when the above-described amounts of compounds (A) are used in the above-described temperature range. While not desiring to be bound, it is believed that the compounds (A) behave as a solvent like IPA.

For the same purpose, the use of surfactants composed of alkyl ethers of propylene oxide are disclosed in JP-B-55-19757. However, since the number of moles of propylene oxide added is large, the clouding points of the dampening solutions containing the surfactants are low at the afore-mentioned upper temperature of 35° to 40° C. on printing presses. These clouding points exhibit the properties of ordinary nonionic surfactants. Namely, the solubility of the surfactants is poor and there is a difficulty in putting the surfactants to practical use.

On the other hand, the desired purpose can be achieved by using the compounds (A) without the above-described problems occurring.

When the compounds (A) are used, the dynamic surface tension of the dampening solution is reduced, transfer of the solution with a Dahlgren system dampening feeder, in particular, is good, and the hydrophilic non-image areas can be uniformly wetted and foaming scarcely occurs.

The dampening solution compositions of the present invention contain compounds (A) in an amount of 0.1 to 10% by weight, preferably 1 to 7% by weight based on the total weight of the dampening solution composition. When the content of compound (A) is less than 0.1% by weight, surface tension is not reduced sufficiently, ink spreads on the surface of the dampening solution and scumming and tinting on prints occurs. When the content is higher than 10% by weight, such a large amount is disadvantageous with respect to cost, although the viscosity of the dampening solution is increased and such a large amount is effective with regard to water setting.

When R in compound (A) is a butyl group or higher group and n is 5 or greater, solubility in water is poor and the desired purpose cannot be achieved. Further, the boiling point is increased and hence failure in drying on the printed surface and offset occur.

Specific examples of the compound (A) of the present invention include propylene glycol monomethyl ether, propylene glycol monoethyl ether, propylene glycol mono-n-propyl ether, propylene glycol monoisopropyl ether, dipropylene glycol monomethyl ether, dipropylene glycol monoethyl ether, dipropylene glycol mono-n-propyl ether, dipropylene glycol monoisopropyl ether, tripropylene glycol monomethyl ether, tripropylene glycol monoethyl ether, tripropylene glycol mono-n-propyl ether, tripropylene glycol monoisopropyl ether, tetrapropylene glycol monomethyl ether, tetrapropylene glycol monoethyl ether, tetrapropylene glycol mono-n-propyl ether and tetrapropylene glycol monoisopropyl ether.

Among them, propylene glycol monomethyl ether, propylene glycol mono-n-propyl ether, propylene glycol monoisopropyl ether, dipropylene glycol monoethyl ether, dipropylene glycol monoisopropyl ether, tripropylene glycol monomethyl ether, tripropylene glycol monoethyl ether, tripropylene glycol monoisopropyl ether, tetrapropylene glycol monomethyl ether and tetrapropylene glycol monoisopropyl ether are preferred.

The dampening solution compositions of the present invention may contain gum arabic, dextrin, sodium alginate, carboxymethyl cellulose, hydroxymethyl cellulose, polyvinyl alcohol, polyvinyl pyrrolidone, polyacrylic acid or polyacrylamide as a desensitizing agent for the protection of the surface of the plate in an amount of 0.01 to 0.1% by weight based on the total weight of the dampening solution. Further, nitric acid, sulfuric acid, phosphoric acid, citric acid, acetic acid, tartaric acid or the sodium, potassium or magnesium salts thereof, or ammonium dichromate may be present in an amount of 0.01 to 0.5% by weight based on the total weight of the dampening solution depending on anti-scumming purpose or pH controlling purpose. Furthermore, conventional surfactants such as anionic, cationic or nonionic surfactants may be present in an amount of 0.01 to 0.5% by weight based on the total weight of the dampening solution for surface tension reducing aid purpose. In addition, an antiseptic may be optionally contained in the dampening solution.

The present invention is illustrated in detail by reference to the following non-limiting examples and comparative examples. In the following examples and comparative examples, parts are by weight unless otherwise indicated.

Dampening solutions having formulations indicated in Examples 1 to 10 and Comparative Examples 1 to 7 were prepared. The characteristics such as ink bleed, etc., of these solutions were measured. Further, printing tests were carried out to examine water tolerance, scumming, tinting, etc.

EXAMPLE 1

| | |
|---|---|
| Water | 9493 parts |
| Tripropylene Glycol Monomethyl Ether | 500 parts |
| Phosphoric Acid | 1 part |
| Magnesium Nitrate | 1 part |
| Gum Arabic | 5 parts |

EXAMPLE 2

| | |
|---|---|
| Water | 9493 parts |
| Tetrapropylene Glycol Monomethyl Ether | 500 parts |
| Phosphoric Acid | 1 part |
| Magnesium Nitrate | 1 part |
| Gum Arabic | 5 parts |

EXAMPLE 3

| | |
|---|---|
| Water | 9493 parts |
| Tripropylene Glycol Monoethyl Ether | 500 parts |
| Phosphoric Acid | 1 part |
| Magnesium Nitrate | 1 part |
| Gum Arabic | 5 parts |

EXAMPLE 4

| | |
|---|---|
| Water | 9493 parts |
| Tripropylene Glycol Monoisopropyl Ether | 500 parts |
| Phosphoric Acid | 1 part |
| Magnesium Nitrate | 1 part |
| Gum Arabic | 5 parts |

EXAMPLE 5

| | |
|---|---|
| Water | 9493 parts |
| Tripropylene Glycol Monoethyl Ether | 250 parts |
| Tetrapropylene Glycol Monomethyl Ether | 250 parts |
| Phosphoric Acid | 1 part |
| Magnesium Nitrate | 1 part |
| Gum Arabic | 5 parts |

EXAMPLE 6

| | |
|---|---|
| Water | 9493 parts |
| Dipropylene Glycol Monoisopropyl Ether | 250 parts |
| Dipropylene Glycol Monoethyl Ether | 250 parts |
| Phosphoric Acid | 1 part |
| Magnesium Nitrate | 1 part |
| Gum Arabic | 5 parts |

EXAMPLE 7

| Water | 9842 parts |
|---|---|
| Propylene Glycol Monomethyl Ether | 150 parts |
| Polyoxyethyl-Polyoxypropylene Block Copolymer (Emulgen PP-230, trade name, manufactured by Kao Corporation) | 1 part |
| Phosphoric Acid | 1 part |
| Magnesium Nitrate | 1 part |
| Gum Arabic | 5 parts |

EXAMPLE 8

| Water | 9962 parts |
|---|---|
| Propylene Glycol Mono-n-propyl Ether | 30 parts |
| Polyoxyethylene-Polyoxypropylene Block Copolymer (Emulgen PP-230) | 1 part |
| Phosphoric Acid | 1 part |
| Magnesium Nitrate | 1 part |
| Gum Arabic | 5 parts |

EXAMPLE 9

| Water | 9942 parts |
|---|---|
| Dipropylene Glycol Monoethyl Ether | 50 parts |
| Polyoxyethylene-Polyoxypropylene Block Copolymer (Emulgen PP-230) | 1 part |
| Phosphoric Acid | 1 part |
| Magnesium Nitrate | 1 part |
| Gum Arabic | 5 parts |

EXAMPLE 10

| Water | 9953 parts |
|---|---|
| Tetrapropylene Glycol Monoisopropyl Ether | 40 parts |
| Phosphoric Acid | 1 part |
| Magnesium Nitrate | 1 part |
| Gum Arabic | 5 parts |

COMPARATIVE EXAMPLE 1

| Water | 8992 parts |
|---|---|
| Isopropyl Alcohol | 1000 parts |
| Phosphoric Acid | 1 part |
| Magnesium Nitrate | 1 part |
| Gum Arabic | 5 parts |

COMPARATIVE EXAMPLE 2

| Water | 9943 parts |
|---|---|
| Ethylene Glycol Monobutyl Ether | 50 parts |
| Phosphoric Acid | 1 part |
| Magnesium Nitrate | 1 part |
| Gum Arabic | 5 parts |

COMPARATIVE EXAMPLE 3

| Water | 9893 parts |
|---|---|
| Polyoxyethylene-Polyoxypropylene Block Copolymer (Emulgen PP-230) | 100 parts |
| Phosphoric Acid | 1 part |
| Magnesium Nitrate | 1 part |
| Gum Arabic | 5 parts |

COMPARATIVE EXAMPLE 4

| Water | 9987 parts |
|---|---|
| Sodium Dialkyl Sulfosuccinate | 10 parts |
| Polyoxyethylene Sorbitan Monolaurate (Rheodol TW-L106, trade name, manufactured by Kao Corporation) | 1 part |
| Phosphoric Acid | 1 part |
| Magnesium Nitrate | 1 part |

COMPARATIVE EXAMPLE 5

| Water | 9493 parts |
|---|---|
| Triethylene Glycol Monomethyl Ether | 500 parts |
| Phosphoric Acid | 1 part |
| Magnesium Nitrate | 1 part |
| Gum Arabic | 5 parts |

COMPARATIVE EXAMPLE 6

| Water | 9493 parts |
|---|---|
| Tripropylene Glycol | 500 parts |
| Phosphoric Acid | 1 part |
| Magnesium Nitrate | 1 part |
| Gum Arabic | 5 parts |

COMPARATIVE EXAMPLE 7

| Water | 9493 parts |
|---|---|
| Propylene Glycol Monobutyl ether | 500 parts |
| Phosphoric Acid | 1 part |
| Magnesium Nitrate | 1 part |
| Gum Arabic | 5 parts |

The pH, surface tension, ink bleed and odor of the dampening solutions of these Examples and Comparative Examples were measured. The results are shown in Table 1.

The pH was measured thrice at 25° C. by using a pH meter (MODEL HM-7E, manufactured by Toa Denpa Kogyo Co., Ltd.) and expressed in the mean value.

Surface tension was measured thrice at 25° C. by using a surface tension meter (KYOWA CBVP SURFACE TENSIOMETER A-3, trade name, manufactured by Kyowa Kagaku Co., Ltd.) and expressed in the mean value.

Odor was organoleptically evaluated by five panelists and the major result was indicated in Table 1. In Table 1, the symbol ◯ means odorless and the symbol x means that an odor was present.

Ink bleed in Table 1 shows the degree of spreading of ink when TK mark V geranium-M (offset printing ink, manufactured by Toyo Ink Mfg. Co., Ltd.) was allowed to drop onto the dampening solution. The grading was as follows. The dampening solution of Comparative Example 7 was cloudy. Hence, it was considered that the dampening solution was ineffective and was excluded from measurement.

◯: Ink did not spread over the surface of the dampening solution.

x: Ink spread over the surface of the dampening solution.

TABLE 1

| | pH | Surface Tension (dyne/cm) | Ink Bleed | Odor |
|---|---|---|---|---|
| Example 1 | 4.7 | 40.4 | ○ | ○ |
| Example 2 | 4.7 | 37.6 | ○ | ○ |
| Example 3 | 4.8 | 31.9 | ○ | ○ |
| Example 4 | 4.7 | 28.0 | ○ | ○ |
| Example 5 | 4.8 | 29.0 | ○ | ○ |
| Example 6 | 4.7 | 33.2 | ○ | ○ |
| Example 7 | 4.8 | 43.0 | ○ | ○ |
| Example 8 | 4.7 | 44.5 | ○ | ○ |
| Example 9 | 4.8 | 44.0 | ○ | ○ |
| Example 10 | 4.7 | 43.1 | ○ | ○ |
| Comparative Example 1 | 4.9 | 39.9 | X | X |
| Comparative Example 2 | 4.7 | 49.5 | X | X |
| Comparative Example 3 | 4.8 | 35.5 | X | ○ |
| Comparative Example 4 | 4.7 | 34.0 | X | ○ |
| Comparative Example 5 | 4.8 | 62.5 | X | ○ |
| Comparative Example 6 | 4.7 | 54.1 | X | ○ |

Printing tests were carried out using the dampening solutions of these Examples and Comparative Examples. The printing conditions used were as follows.
Printing Press: Mitsubishi Daiya I-4 (trade name, manufactured by Mitsubishi Heavy Industries, Ltd.)
Printing speed: 10,000 revolutions/hr.
Paper: SK coat 4/6 90K (trade name, manufactured by Sanyo Kokusaku Co., Ltd.)
Dampening mechanism: Dahlgren system.
Temperature and humidity: 20° to 22° C., 40 to 50% RH
Ink: TK mark V geranium-M (trade name, manufactured by Toyo Ink Mfg. Co., Ltd.)

Each dampening solution was used on the printing press to produce 10,000 sheets of prints. After the completion of the printing test, the degree of scumming, water tolerance and the degree of foaming were examined. The degree of scumming was evaluated with the naked eye. The results obtained are shown in Table 2 below.

TABLE 2

| | Scumming of Print | Water Tolerance | Foaming |
|---|---|---|---|
| Example 1 | No scumming | 50 | ○ |
| Example 2 | No scumming | 50 | ○ |
| Example 3 | No scumming | 50 | ○ |
| Example 4 | No scumming | 50 | ○ |
| Example 5 | No scumming | 50 | ○ |
| Example 6 | No scumming | 50 | ○ |
| Example 7 | No scumming | 50 | ○ |
| Example 8 | No scumming | 50 | ○ |
| Example 9 | No scumming | 50 | ○ |
| Example 10 | No scumming | 50 | ○ |
| Comparative Example 1 | No scumming | 45 | ◉ |
| Comparative Example 2 | Scummed, bad print | 70 | ◉ |
| Comparative Example 3 | Scummed, bad print | 100 | XX |
| Comparative Example 4 | Scummed, bad print | 100 | XX |
| Comparative Example 5 | Scummed, bad print | 70 | ◉ |
| Comparative Example 6 | Scummed, bad print | 100 | ○ |

Note: Water tolerance is a Dahlgen meter setting value at which scumming on print is formed when the amount of the dampening solution fed to the surface of the plate is reduced. A smaller value shows that the non-image areas are uniformly protected by a smaller amount of the dampening solution.

The criteria of the degree of foaming were as follows.
◉: not foamed.
○: Foaming was observed, but no trouble on printing was caused.
xx: Forming markedly occurred and there was a difficulty in conducting printing.

It is apparent from the results above that the dampening solutions of the present invention have a printability at least equal to that of IPA-containing dampening solutions.

The figure shows the graphically relationship between Dahlgren meter setting and the amount of the dampening solution on the non-image area of the plate in Example 1 and Comparative Examples 1 and 3. The amount of the dampening solution on the non-image area of the plate was measured by using infrared ray. It can be seen that the transfer of the dampening solution of the present invention is remarkably improved in comparison with the dampening solution using conventional surfactant and the compound of the present invention exhibits substantially the behavior provided by IPA.

According to the present invention, dampening solutions are provided having excellent printability equal to or higher than that of isopropyl alcohol-containing dampening solutions widely used as dampening solutions for lithographic printing.

According to the present invention, further, dampening solutions for lithographic printing are provided having excellent properties such as an odor is not present and ink bleed does not occur.

Furthermore, dampening solutions for lithographic printing are provided which have excellent printability with no scumming is occurring, wide water tolerance, good transfer of the dampening solution from a pan and superior wettability.

While the invention has been described in detail and with reference to specific embodiments thereof, it will be apparent to one skilled in the art that various changes and modifications can be made therein without departing from the spirit and scope thereof.

What is claimed is:

1. A dampening solution composition for lithographic printing which consists essentially of
   (a) water, and
   (b) a compound (A) represented by the following formula (I)

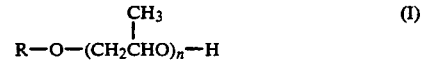

wherein R represents a methyl group, an ethyl group, an n-propyl group or an isopropyl group, and n represents an integer of 1 to 4, wherein said composition contains from 0.1 to 10% by weight, based on the total weight of the composition, of said compound (A).

2. The dampening solution composition of claim 1, wherein said compound (A) of formula (I) is at least one compound selected from among propylene glycol monomethyl ether, propylene glycol monoethyl ether, propylene glycol mono-n-propyl ether, propylene glycol monoisopropyl ether, dipropylene glycol monomethyl ether, dipropylene glycol monoethyl ether, dipropylene glycol mono-n-propyl ether, dipropylene glycol monoisopropyl ether, tripropylene glycol monomethyl ether, tripropylene glycol monoethyl ether, tripropylene glycol mono-n-propyl ether, tripropylene glycol monoisopropyl ether, tetrapropylene glycol monomethyl ether, tetrapropylene glycol monoethyl ether, tetrapropylene glycol mono-n-propyl ether and tetrapropylene glycol monoisopropyl ether.

3. The dampening solution composition of claim 1, wherein said composition contains from 1% to 7% by weight, based on the total weight of the composition, of said compound (A) of formula (I).

4. The dampening solution composition of claim 1, wherein said composition additionally contains at least one of gum arabic, dextrin, sodium alginate, carboxymethyl cellulose, hydroxymethyl cellulose, polyvinyl alcohol, polyvinyl pyrrolidone, polyacrylic acid or polyacrylamide.

5. The dampening solution composition of claim 1, wherein said composition additionally contains at least one of nitric acid, sulfuric acid, phosphoric acid, citric acid, acetic acid, tartaric acid or the sodium, potassium or magnesium salts thereof, ammonium dichromate, an antiseptic, an anionic surfactant, a cationic surfactant or a nonionic surfactant.

* * * * *